United States Patent
Fukaya et al.

[11] Patent Number: 6,123,874
[45] Date of Patent: Sep. 26, 2000

[54] THICK-FILM RESISTOR PASTE

[75] Inventors: Masashi Fukaya, Kuwana; Tomoko Matsuo, Nagoya; Yoshinobu Watanabe, Hiratsuka; Chiaki Higuchi, Ebina, all of Japan

[73] Assignee: Sumitomo Metal (SMI) Electronics Devices Inc., Mine, Japan

[21] Appl. No.: 09/017,949

[22] Filed: Feb. 3, 1998

[30] Foreign Application Priority Data

Oct. 21, 1997 [JP] Japan ..................... 9-026220

[51] Int. Cl.⁷ ................ H01B 1/02; H01B 1/06
[52] U.S. Cl. .................... 252/518.1; 252/500
[58] Field of Search ................... 252/512, 513, 252/514, 518.1, 500, 511, 520, 521

[56] References Cited

U.S. PATENT DOCUMENTS

| | | | |
|---|---|---|---|
| 4,302,362 | 11/1981 | Hoffman et al. | 252/520 |
| 5,164,342 | 11/1992 | Muralidhar et al. | 501/20 |
| 5,474,711 | 12/1995 | Borland et al. | 252/518 |
| 5,491,118 | 2/1996 | Hormadaly | 501/20 |

FOREIGN PATENT DOCUMENTS

| | | |
|---|---|---|
| 0 548 865 | 6/1993 | European Pat. Off. . |
| 4-196104 | 7/1992 | Japan . |
| 4-196105 | 7/1992 | Japan . |

*Primary Examiner*—Yogendra Gupta
*Assistant Examiner*—D. Hamlin
*Attorney, Agent, or Firm*—Foley & Lardner

[57] ABSTRACT

A thick-film resistor paste consists of a first glass powder, a second glass powder, a conductive material powder, and an organic vehicle. A quantity of the first glass powder mixed is larger than a quantity of the second glass powder mixed. The first glass powder contains, in total, 95 percentage by weight or above of CaO of 20 to 26 percentage by weight, $SiO_2$ of 37 to 59 percentage by weight, $Al_2O_3$ of 5 to 13 percentage by weight and $B_2O_3$ of 8 to 28 percentage by weight. The second glass powder contains, in total, 85 percentage by weight or above of $SiO_2$ of 53 to 72 percentage by weight, $B_2O_3$ of 20 to 30 percentage by weight and $Na_2O$ of 1 to 7 percentage by weight. The thermal expansion coefficient of the first glass powder is larger by $0.5 \times 10^{-6}/\deg$ or above than the thermal expansion coefficient of the second glass powder. A glass transition point of the first glass powder is higher by 30 degrees Celsius or above than a glass transition point of the second glass powder.

5 Claims, 3 Drawing Sheets

FIRST HALF STAGE OF FIRING

SECOND HALF STAGE OF FIRING

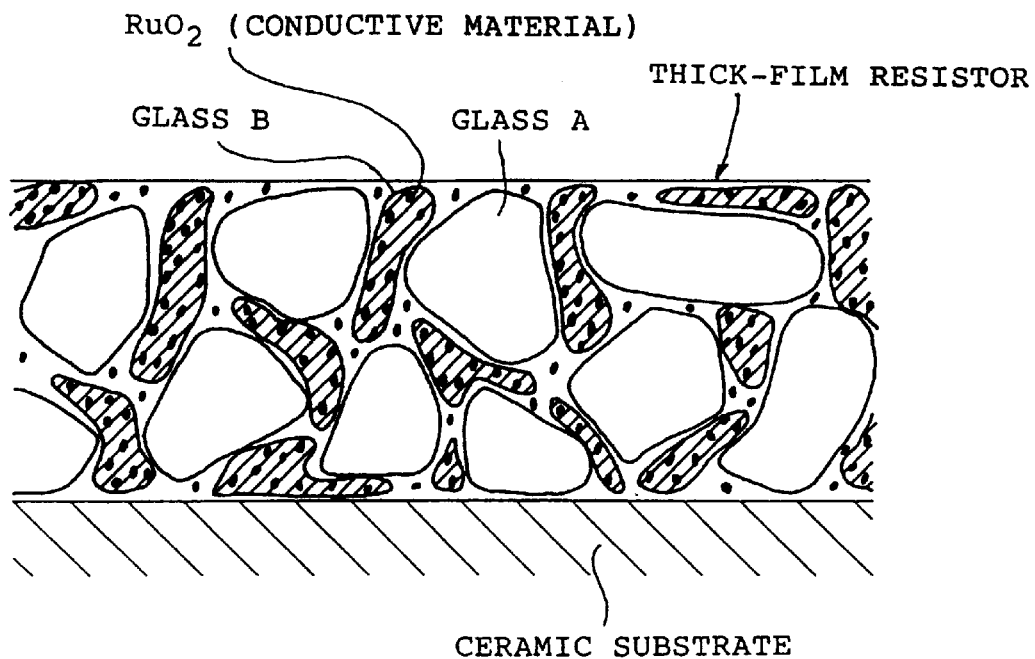
FIG. 1A FIRST HALF STAGE OF FIRING
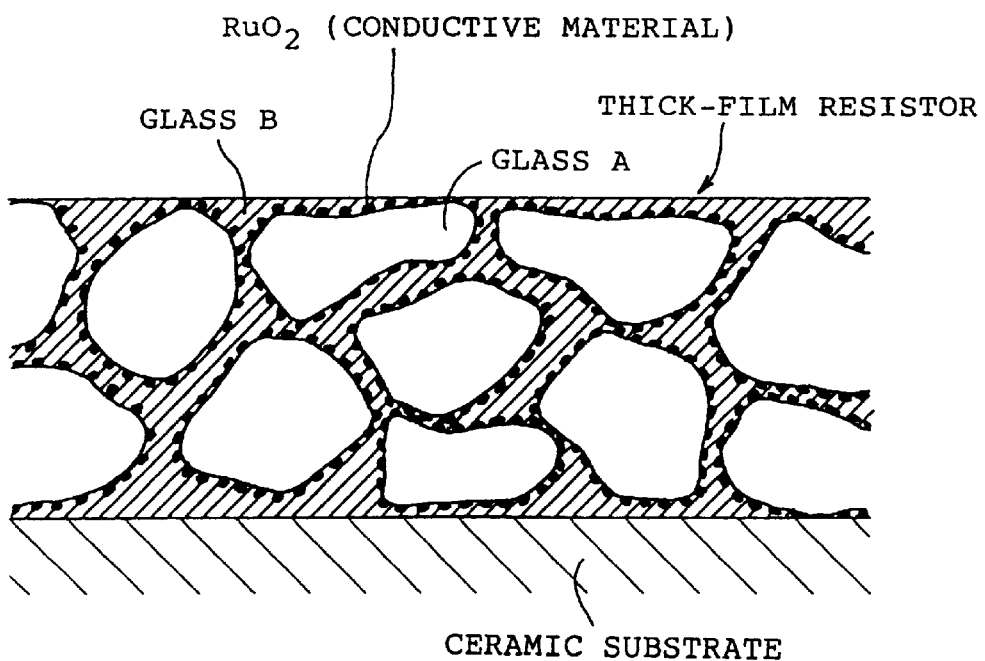
FIG. 1B SECOND HALF STAGE OF FIRING

THICK-FILM RESISTOR PASTE

BACKGROUND OF THE INVENTION

1. Field of the Invention

This invention relates to a thick-film resistor paste containing a glass powder and a conductive material powder, and more particularly to such a thick-film resistor paste suitable for fabricating thick-film resistors on a ceramic substrate.

2. Description of the Prior Art

A thick-film resistor paste of $RuO_2$ system is conventionally printed on a surface of a ceramic substrate into a thick-film resistor pattern when resistors are fabricated on the substrate surface by a thick-film process. The thick-film resistor pattern is then fired at a temperature ranging between 600 and 900° C. to be fabricated into thick-film resistors. Since a resistance value of the thick-film resistor generally varies after the firing, the thick-film resistor is trimmed by a laser trimming process after the firing so that the resistance value is adjusted.

In the laser trimming, thermal strain sometimes results in occurrence of microcracks in the thick-film resistor. The microcracks gradually progress in the actual use of the ceramic substrate, whereupon the resistance value of the thick-film resistor accordingly varies with time. The variation of the resistance value lowers the reliability of the circuit. The microcracks tend to progress under the condition where the thick-film resistor is subjected to a tensile stress. Accordingly, a compressive force is desired to be applied to the thick-film resistor so that the progress of microcracks is prevented. For this purpose, the thick-film resistor needs to have a smaller thermal expansion coefficient than the ceramic substrate.

However, the thick-film resistor paste conventionally used to fabricate the thick-film resistor on the ceramic substrate consists of a mixture of a glass powder, $RuO_2$ powder and an organic vehicle. $RuO_2$ has a thermal expansion coefficient of $6.0 \times 10^{-6}$/deg. On the other hand, a low-temperature fired ceramic substrate has a thermal expansion coefficient of $5.5 \times 10^{-6}$/deg, which value is smaller than a thermal expansion coefficient of an alumina substrate. Accordingly, the glass of the thick-film resistor paste is desired to have a thermal expansion coefficient smaller than $5.5 \times 10^{-6}$/deg. However, a selection range of glass is limited when electric characteristics, mechanical strength, harmfulness, etc. are taken into consideration. Thus, the thermal expansion coefficient of the conventionally used glass is unavoidably approximately equal to or larger than that of the ceramic substrate. In this state of art, the thermal expansion coefficient of the thick-film resistor containing the above-described glass and $RuO_2$ is approximately equal to that of the ceramic substrate at the smallest. Accordingly, the thick-film resistor is subjected to an insufficient compressive force due the difference between the thermal expansion coefficients of the thick-film resistor and the ceramic substrate. Moreover, a tensile force is sometimes applied to the thick-film resistor. Consequently, the microcracks produced in the thick-film resistor during the laser trimming tends to progress in the actual use, resulting in large variations in the resistance value of the thick-film resistor with progress of time.

SUMMARY OF THE INVENTION

Therefore, an object of the present invention is to provide a thick-film resistor paste which can reduce the variations in the resistance value of the thick-film resistor with progress of time.

To accomplish the object, the present invention provides a thick-film resistor paste consisting of a mixture of a first glass powder, a second glass powder, a conductive material powder, and an organic vehicle, wherein a quantity of the first glass powder mixed is larger than a quantity of the second glass powder mixed, and the first glass powder has a thermal expansion coefficient larger and a glass transition point higher than the second glass powder.

The thick-film resistor paste thus composed is sintered into a thick-film resistor through the following steps of the firing when printed on a ceramic substrate and then fired.

First step:

The second glass having a lower glass transition point first melts due to a temperature increase during the firing. The melted second glass powder envelops the conductive material powder as schematically shown in FIG. 1A. The first glass powder having a higher glass transition point is not melted at this stage. The glass transition point corresponds to a softening temperature of the glass at which the thermal expansion of the glass with an increase in the temperature stops. The thermal expansion of the glass progresses substantially linearly with an increase in the temperature below the glass transition point. The glass shrinks above the glass transition point.

Second step:

The first glass powder having the higher glass transition point gradually melts in this step. The previously melted second glass flows to envelop the first glass.

Third step:

With further progress of the firing, the first glass melts to adhere close to the second glass as schematically shown in FIG. 1B. The conductive material gathers or coheres to an interface between the first and second glasses, thereby forming conductive paths. The organic vehicle contained in the thick-film resistor paste is thermally decomposed or burned during the first to third steps so that the organic vehicle is eliminated from the film of the thick-film resistor.

Fourth step:

Both of the first and second glasses are hardened due to a temperature decrease at a final stage of the firing, whereupon the film of the thick-film resistor is formed on the ceramic substrate.

The thus fired thick-film resistor has a structure in which the second glass having a smaller thermal expansion coefficient envelops the first glass having a larger thermal expansion coefficient. In this structure, the second glass reduces the thermal expansion coefficient of the overall thick-film resistor. Moreover, the first glass applies a compressive force to the second glass. Consequently, the second glass subjected to the compressive force restrains the progress of microcracks even when the laser trimming performed after the firing results in the microcracks in the thick-film resistor.

The effect of restraining the progress of microcracks is increased with an increase in the compressive force applied to the second glass. The compressive force is increased with an increase in the difference between the thermal expansion coefficients of the first and second glasses. Furthermore, in order that the second glass may envelop the first glass, the second glass needs to be sufficiently melted until the first glass starts to melt. Accordingly, the first glass cannot sufficiently be enveloped by the second glass when the differences are small between the glass transition points and accordingly between the temperatures at which the first and second glasses start to melt, respectively. In this structure, a sufficient compressive force is not applied to the second glass even when the difference in the thermal expansion coefficient is large between the first and second glasses.

In view of the above-described drawback, the thermal expansion coefficient of the first glass powder is preferably larger by $0.5 \times 10^{-6}$/deg or above than the thermal expansion coefficient of the second glass powder. The glass transition point of the first glass powder is preferably higher by 30 degrees Celsius or above than the glass transition point of the second glass powder. In this case, the second glass sufficiently melts before the first glass starts to melt, whereupon the second glass reliably envelops the first glass. Furthermore, since the difference between the thermal expansion coefficients of the first and second glasses is at or above $0.5 \times 10^{-6}$/deg, the compressive force the first glass applies to the second glass is sufficiently increased. Consequently, the compressive force sufficient to restrain the progress of microcracks can be obtained such that the variations in the resistance value of the thick-film resistor with progress of time can effectively be restrained.

Each of the first and second glass powders preferably excludes Pb, Cd and Ni. Pb, Cd and Ni contained in the conventional thick-film resistor paste are metals each having a possibility of adversely affecting global environment. Since each of the first and second glasses does not contain Pb, Cd and Ni, waste disposal can readily be carried out, and the protection of global environment can be enhanced.

Regarding a desired composition of glass, the first glass powder preferably contains, in total, 95 percentage by weight or above of CaO of 20 to 26 percentage by weight, $SiO_2$ of 37 to 59 percentage by weight, $Al_2O_3$ of 5 to 13 percentage by weight and $B_2O_3$ of 8 to 28 percentage by weight, and the second glass powder preferably contains, in total, 85 percentage by weight or above of $SiO_2$ of 53 to 72 percentage by weight, $B_2O_3$ of 20 to 30 percentage by weight and $Na_2O$ of 1 to 7 percentage by weight. The above-described composition of each of the first and second glasses can ensure the difference of $0.5 \times 10^{-6}$/deg or above between the thermal expansion coefficients of both glasses and the difference of 30 degrees Celsius or above between the glass transition points of both glasses.

Since the second glass to which the compressive force is applied restrains the progress of microcracks, a certain quantity of the second glass to be mixed is required. However, a tensile force the second glass applies to the first glass is increased with an increase in the quantity of the second glass, whereupon the microcrack restraining effect is reduced by the tensile force applied to the first glass. In view of this drawback, the first glass powder preferably has a mixing ratio of 73 to 99 percentage by weight to a total quantity of the first and second glass mixed, and the second glass powder has a mixing ratio of 27 to 1 percentage by weight. The results of a temperature cycling test carried by the inventors, which will be described in detail later, confirm that a change rate of the resistance value of the thick-film resistor exceeds a target value of 1% when a mixing ratio of the second glass exceeds 27 percentage by weight, whereupon an effective microcrack restraining effect is not obtained from the second glass, as shown in FIG. 3. Furthermore, the results of the tests confirm that the change rate of the resistance value of the thick-film resistor is below 1% even when the mixing ratio of the second glass is 1 percentage by weight, whereupon an effective microcrack restraining effect is obtained from the second glass. Consequently, a sufficient microcrack restraining effect can be achieved from the second glass when the mixing ratio of the second glass ranges between 27 and 1 percentage by weight.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 1A illustrates a thick-film resistor of one embodiment in accordance with the present invention, showing the state of the thick-film resistor in a first half stage of the firing;

FIG. 1B illustrates the state of the thick-film resistor in a second half stage of the firing;

DETAILED DESCRIPTION OF THE PREFERRED EMBODIMENT

Figure 2:
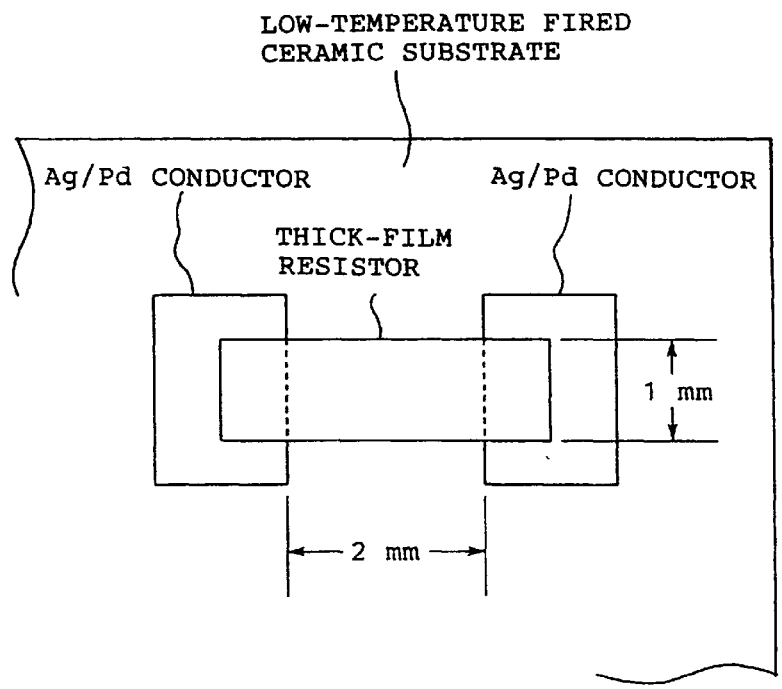
FIG. 2 is a schematic plan view of the thick-film resistor employed in the temperature cycling test, explaining the shape and size of the thick-film resistor.

One embodiment of the present invention will be described with reference to the accompanying drawings. A thick-film resistor paste of the embodiment consists of a mixture of a powder of glass A, a powder of glass B, a powder of $RuO_2$ serving as an electrically conductive material, and an organic vehicle. The organic vehicle consists of a binder resin such as ethyl cellulose and a solvent such as terpineol. A quantity of the glass A mixed is larger than a quantity of the glass B mixed. The glass A having a larger quantity contains, in total, 95 percentage by weight or above of CaO of 20 to 26 percentage by weight, $SiO_2$ of 37 to 59 percentage by weight, $Al_2O_3$ of 5 to 13 percentage by weight and $B_2O_3$ of 8 to 28 percentage by weight. The glass B having a smaller quantity contains, in total, 85 percentage by weight or above of $SiO_2$ of 53 to 72 percentage by weight, $B_2O_3$ of 20 to 30 percentage by weight and $Na_2O$ of 1 to 7 percentage by weight. Each of the glasses A and B does not contain or excludes lead (Pb), cadmium (Cd) and nickel (Ni), which are metals each having a possibility of adversely affecting global environment. In the case where A$\alpha$ designates a coefficient of thermal expansion of the glass A, AD a glass transition point, B$\alpha$ a coefficient of thermal expansion of the glass B, and BD a glass transition point, the following relations hold:

$$A\alpha - B\alpha \geq 0.5 \times 10^{-6}/\text{deg and}$$

$$AD - BD \geq 30° \text{ C.}$$

The glass A has a mixing ratio of 73 to 99 percentage by weight to a total quantity of the glasses A and B, and the glass B has a mixing ratio of 27 to 1 percentage by weight. A mixing ratio of $RuO_2$ to the thick-film resistor paste may be determined according to a required resistance value. The resistance value is decreased with an increase in the mixing ratio of $RuO_2$.

EXAMPLES

A temperature cycling test was carried out to reveal the relations between the composition, thermal expansion coefficient and glass transition point of each of the glasses A and B, and a change rate of the resistance value of the thick-film resistor due to the test. TABLE 1 shows five samples A1 to A5 of the glass A each having the larger quantity, and TABLE 2 shows five samples B1 to B5 of the glass B each having the smaller quantity.

age by weight, $B_2O_3$ of 20 to 30 percentage by weight and $Na_2O$ of 1 to 7 percentage by weight. The glass transition points of the samples B1 to B5 ranged between 636 and 661° C. The thermal expansion coefficients of the samples B1 to B5 ranged between $3.95\times10^{-6}$/deg and $4.94\times10^{-6}$/deg.

TABLE 1

Samples of glass A

| Sample | CaO (Wt. %) | $SiO_2$ (Wt. %) | $Al_2O_3$ (Wt. %) | $B_2O_3$ (Wt. %) | Other (Wt. %) | Glass transition point (° C.) | Thermal expansion coeff. ($\times10^{-6}$/deg) |
|---|---|---|---|---|---|---|---|
| A1 | 26.0 | 58.8 | 5.7  | 8.6  | 0.9 | 722 | 6.3 |
| A2 | 22.6 | 54.8 | 6.8  | 14.2 | 1.6 | 706 | 6.9 |
| A3 | 20.0 | 48.6 | 9.3  | 19.3 | 2.8 | 702 | 5.4 |
| A4 | 24.5 | 41.2 | 9.6  | 22.5 | 2.2 | 693 | 5.8 |
| A5 | 21.2 | 37.6 | 12.2 | 27.2 | 1.8 | 685 | 6.1 |

TABLE 2

Samples of glass B

| Sample | $SiO_2$ (Wt. %) | $Al_2O_3$ (Wt. %) | $B_2O_3$ (Wt. %) | CaO (Wt. %) | $Na_2O$ (Wt. %) | ZnO (Wt. %) | $K_2O$ (Wt. %) | Other (Wt. %) | Glass transition point (° C.) | Thermal expansion coefficient ($\times10^{-6}$/deg) |
|---|---|---|---|---|---|---|---|---|---|---|
| B1 | 66.0 | 1.2 | 23.5 | 1.6 | 3.6 | 1.6 | 1.0 | 1.5 | 650 | 4.09 |
| B2 | 72.0 | 0.8 | 20.3 | 1.0 | 3.1 | 1.2 | 0.7 | 0.9 | 661 | 3.95 |
| B3 | 61.6 | 3.4 | 24.9 | 4.9 | 1.9 | 0   | 2.6 | 0.7 | 645 | 4.25 |
| B4 | 56.7 | 7.1 | 25.4 | 0   | 6.6 | 2.1 | 0   | 2.1 | 638 | 4.57 |
| B5 | 53.1 | 5.5 | 29.8 | 3.3 | 4.9 | 1.3 | 1.5 | 0.6 | 636 | 4.94 |

Each of the samples A1 to A5 contained, in total, 95 percentage by weight or above of CaO of 20 to 26 percentage by weight, $SiO_2$ of 37 to 59 percentage by weight, $Al_2O_3$ of 5 to 13 percentage by weight and $B_2O_3$ of 8 to 28 percentage by weight. The glass transition points of the samples A1 to A5 ranged between 685 and 722° C. The thermal expansion coefficients of the samples A1 to A5 ranged between $5.4\times10^{-6}$/deg and $6.9\times10^{-6}$/deg.

Each of the samples B1 to B5 contained, in total, 85 percentage by weight or above of $SiO_2$ of 53 to 72 percent- Powders of the glasses A and B having respective mixing ratios as shown in TABLE 3 (examples) and TABLE 4 (compared cases) were mixed with a powder of $RuO_2$ having an average grain diameter of 0.2 μm and an organic vehicle. The mixture was then blended well by a three roll blending machine into a thick-film resistor paste. The mixing ratio of $RuO_2$ powder was changed among 15, 20 and 25 percentage by weight to thereby vary the resistance values of the thick-film resistors.

TABLE 3

Examples

| No. | A | B | A:B | Compounding ratio of $RuO_2$ (Wt. %) | Sheet resistance (KΩ/□) | Change rate of resistance value by temperature cycling (%) | Difference between glass transition points (° C.) | Difference between thermal expansion coefficients ($\times10^{-6}$/deg) |
|---|---|---|---|---|---|---|---|---|
| 1  | A1 | B1 | 99:1  | 15 | 125  | 0.72 | 72 | 2.21 |
| 2  | A1 | B1 | 95:5  | 15 | 110  | 0.45 | 72 | 2.21 |
| 3  | A1 | B1 | 90:10 | 15 | 102  | 0.21 | 72 | 2.21 |
| 4  | A1 | B1 | 85:15 | 15 | 97   | 0.23 | 72 | 2.21 |
| 5  | A1 | B1 | 80:20 | 15 | 94   | 0.55 | 72 | 2.21 |
| 6  | A1 | B1 | 75:25 | 15 | 88   | 0.84 | 72 | 2.21 |
| 7  | A1 | B1 | 90:10 | 20 | 12.1 | 0.17 | 72 | 2.21 |
| 8  | A1 | B1 | 90:10 | 25 | 4.6  | 0.15 | 72 | 2.21 |
| 9  | A1 | B2 | 90:10 | 15 | 105  | 0.23 | 61 | 2.35 |
| 10 | A1 | B3 | 90:10 | 15 | 101  | 0.23 | 77 | 2.05 |
| 11 | A1 | B4 | 90:10 | 15 | 93   | 0.25 | 84 | 1.73 |
| 12 | A1 | B5 | 90:10 | 15 | 92   | 0.24 | 86 | 1.36 |
| 13 | A2 | B3 | 90:10 | 15 | 92   | 0.26 | 61 | 2.65 |
| 14 | A3 | B4 | 90:10 | 15 | 95   | 0.45 | 64 | 0.83 |

TABLE 3-continued

Examples

| No. | A | B | A:B | Compounding ratio of $RuO_2$ (Wt. %) | Sheet resistance (KΩ/□) | Change rate of resistance value by temperature cycling (%) | Difference between glass transition points (° C.) | Difference between thermal expansion coefficients (×10⁻⁶/deg) |
|---|---|---|---|---|---|---|---|---|
| 15 | A4 | B1 | 90:10 | 15 | 99 | 0.29 | 43 | 1.71 |
| 16 | A5 | B3 | 90:10 | 15 | 95 | 0 27 | 40 | 1.85 |

TABLE 4

Compared cases

| No. | A | B | A:B | Compounding ratio of $RuO_2$ (Wt. %) | Sheet resistance (KΩ/□) | Change rate of resistance value by temperature cycling (%) | Difference between glass transition points (° C.) | Difference between thermal expansion coefficients (×10⁻⁶/deg) |
|---|---|---|---|---|---|---|---|---|
| 1 | A1 | — | 100:0 | 15 | 133 | 1.34 | — | — |
| 2 | A1 | B1 | 70:30 | 15 | 84 | 1.26 | 72 | 2.21 |
| 3 | A2 | — | 100:0 | 15 | 115 | 1.35 | — | — |
| 4 | A3 | — | 100:0 | 15 | 107 | 1.67 | — | — |
| 5 | A4 | — | 100:0 | 15 | 106 | 1.52 | — | — |
| 6 | A5 | — | 100:0 | 15 | 101 | 1.85 | — | — |
| 7 | A3 | B5 | 90:10 | 15 | 96 | 1.16 | 66 | 0.46 |
| 8 | A5 | B2 | 90:10 | 15 | 98 | 1.29 | 24 | 2.15 |

Low-temperature fired ceramic circuit substrates each having a thermal expansion coefficient of $5.5 \times 10^{-6}$/deg were used as ceramic substrates on which the thick-film resistor pastes were to be printed. Each low-temperature fired ceramic substrate was made from a ceramic material consisting of a mixture of 60% glass powder of $CaO—Al_2O_3—SiO_2—B_2O_3$ system by weight and 40% $Al_2O_3$ powder by weight. As shown in FIG. 2, an Ag/Pd conductor for electrodes of the resistor was printed and fired on the surface of the low-temperature fired ceramic substrate at intervals of 2 mm. The thick-film resistor paste was screen-printed on the Ag/Pd conductor on the surface of the substrate so as to have a thickness of 20 μm in its dried state and then dried at 120° C. A resultant thick-film resistor pattern has a length of 2 mm and a width of 1 mm. Furthermore, an overcoat glass paste is screen-printed on the thick-film resistor pattern so as to have a thickness of 13 μm in its dried state and then dried at 120° C.

Thereafter, the low-temperature fired ceramic substrate was accommodated in a belt-driven furnace to be fired at a peak temperature of 900° C. for 60 minutes with a holding time of 6 minutes so that the thick-film resistor and the overcoat glass were co-fired.

The above-described thick-film resistor is sintered through the following steps:

First step:

The temperature of the glass is increased with progress of the firing time. The glass B having a lower glass transition point first melts due to a temperature increase during the firing. The melted glass B envelops the $RuO_2$ powder as schematically shown in FIG. 1A. The glass A having a higher glass transition point is not melted at this stage.

Second step:

The glass A having the higher glass transition point gradually start to gradually melt with further increase in the temperature thereof. The previously melted glass B flows to envelop the glass A.

Third step:

With further progress of the firing, the glass A melts to adhere close to the glass B as schematically shown in FIG. 1B. $RuO_2$ coheres to an interface between the glasses A and B, thereby forming conductive paths. The organic vehicle contained in the thick-film resistor paste is thermally decomposed or burned during the first to third steps so that the organic vehicle is eliminated from the film of the thick-film resistor.

Fourth step:

Both of the glasses A and B are hardened due to a temperature decrease at a final stage of the firing, whereupon the film of the thick-film resistor is formed on the ceramic substrate.

The thick-film resistor fired as described above has a structure in which the glass B having a smaller thermal expansion coefficient envelops the glass A having a larger thermal expansion coefficient. In this structure, the glass B reduces the thermal expansion coefficient of the overall thick-film resistor. Moreover, the glass A applies a compressive force to the glass B.

Figure 3:
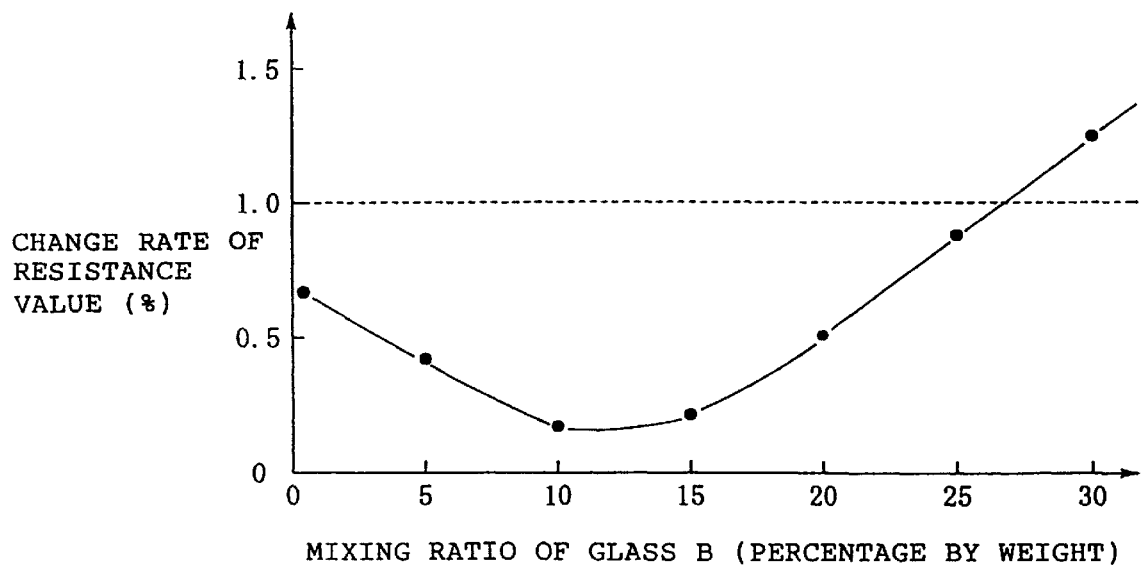
FIG. 3 is a graph showing the relation between the mixing ratio of the glass B and the change rate of the resistance value of the thick-film resistor.
Figure 4:
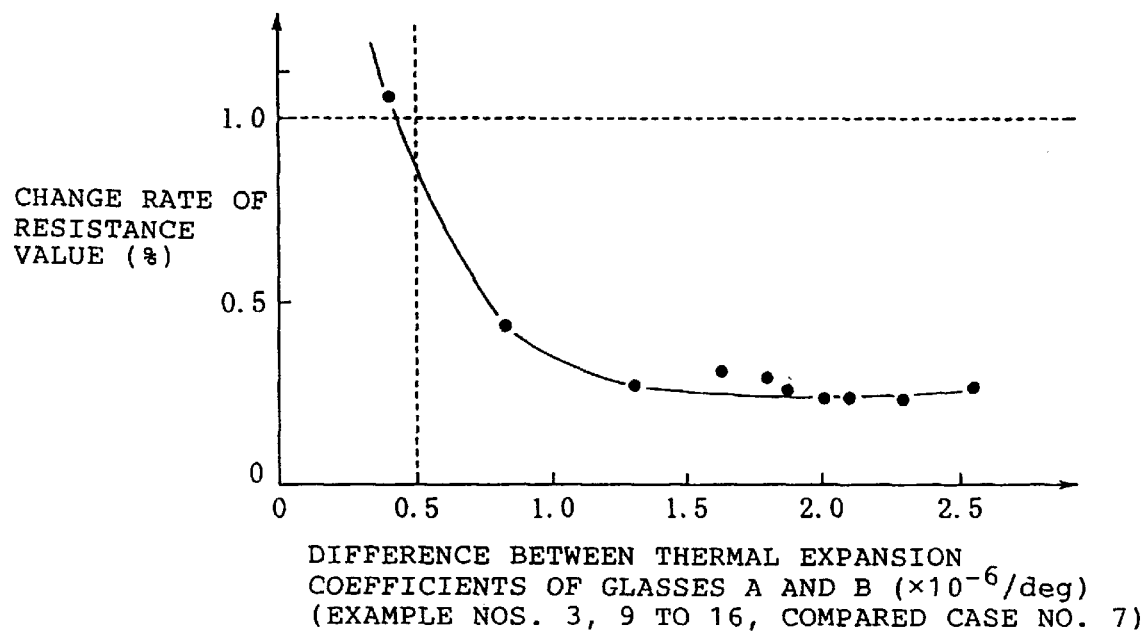
FIG. 4 is a graph showing the relation between the difference between the thermal expansion coefficients of glasses A and B and the change rate of the resistance value of the thick-film resistor.
Figure 5:
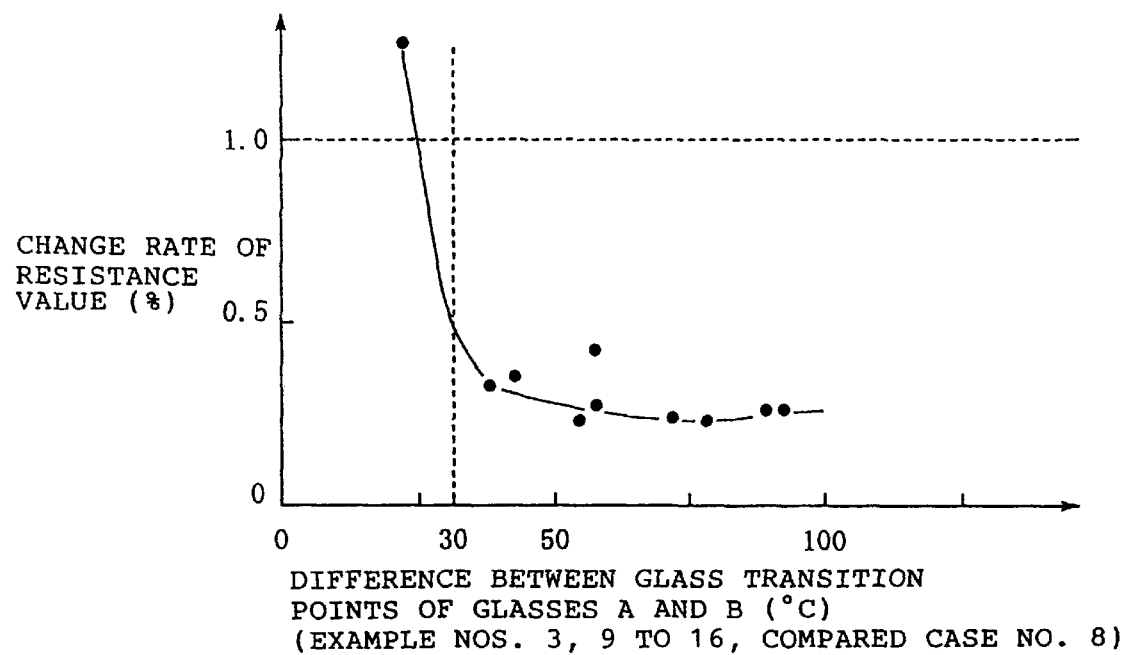
FIG. 5 is a graph showing the relation between the difference between the glass transition points of the glasses A and B and the change rate of the resistance value of the thick-film resistor.

A temperature cycling test was carried out after the surface layer resistor was processed by laser trimming so that the resistance value was adjusted to be twice as large as its initial value. In the temperature cycling test, the thick-film resistor was exposed to a temperature of −40° C. for 30 minutes and then to another temperature of +150° C. for 30 minutes in one cycle. A measurement was taken of a change rate or a ratio of the resistance value of the thick-film resistor after execution of exposure at 1000 cycles to the resistance value after the lapse of 10 minutes from the laser trimming. TABLES 3 (examples of the invention) and 4 (compared cases) show the results of the measurement. The results of the measurement are graphed out in FIGS. 3 to 5. FIG. 3 shows the relation between a mixing ratio of the glass B and the change rate of the resistance value of the thick-film resistor. FIG. 4 shows the relation between the difference in the thermal expansion coefficient between the glasses A and B and the change rate of the resistance value of the thick-film resistor. FIG. 5 shows the relation between the difference between the glass transition points of the glasses A and B and the change rate of the resistance value of the thick-film resistor.

Compared case Nos. 1, 3 to 6 in TABLE 4 show thick-film resistor pastes each containing only the glass A, the composition of which is the same as that of the conventional thick-film resistor paste. In compared case Nos. 1, 3 to 6, the change rate of the resistance value due to the temperature cycling ranges between 1.34 and 1.85. A target value (1% or below) cannot be achieved by the compared case Nos. 1, 3 to 6. The reason for this is that microcracks resulting from the laser trimming of the thick-film resistor progressed as the result of the temperature cycling test.

On the other hand, each of the thick-film resistors fabricated by firing the thick film resistor pastes of example Nos. 1 to 16 in TABLE 3 respectively has a structure in which the glass B having a smaller thermal expansion coefficient envelops the glass A having a larger thermal expansion coefficient. In this structure, the glass B having the smaller thermal expansion coefficient reduces that of the overall thick-film resistor. Moreover, the glass A applies a compressive force to the glass B. Consequently, the glass B subjected to the compressive force restrains the progress of microcracks even when the laser trimming performed after the firing results in the microcracks in the thick-film resistor. Thus, the change rate of the resistance value due to the temperature cycling in the example Nos. 1 to 16 ranges between 0.15 and 0.84%, which range can sufficiently achieve the target value.

Since the glass B to which the compressive force is applied restrains the progress of microcracks, a certain quantity of the glass B is required. However, a tensile force the glass B applies to the glass A is increased with an increase in the quantity of the glass B, whereupon the microcrack restraining effect is reduced by the tensile force applied to the glass A.

The results of the temperature cycling test show that the microcrack restraining effect becomes maximum and the change rate of the resistance value becomes minimum (0.21 to 0.23%) when the mixing ratio of the glass B ranges between 10 and 15%. When the mixing ratio of the glass B exceeds 15%, the change rate of the resistance value is gradually increased with an increase in the mixing ratio of the glass B. The change rate of the resistance value of the thick-film resistor exceeds the target value of 1% when the mixing ratio of the glass B exceeds 27 percentage by weight. Accordingly, the microcrack restraining effect cannot be obtained from the glass B when the mixing ratio thereof exceeds 27 percentage by weight.

Furthermore, when the mixing ratio of the glass B is reduced below 10%, the change rate of the resistance value is gradually increased with a decrease in the mixing ratio of the glass B. However, the change rate of the resistance value is less than 1% when 1% of the glass B by weight is contained in the thick-film resistor. This shows that a sufficient microcrack restraining effect can be achieved when the thick-film resistor contains only 1% glass B by weight. From the results of the temperature cycling test, the glass B is desired to have a mixing ratio of 27 to 1% by weight. Consequently, a sufficient microcrack restraining effect by the glass B can be achieved when the mixing ratio thereof ranges between 27 and 1 percentage by weight.

The effect of restraining the progress of microcracks is increased with an increase in the compressive force applied to the glass B. The compressive force and accordingly the microcrack restraining effect are decreased with a decrease in the difference between the thermal expansion coefficients of the glasses A and B. The results of the temperature cycling test show that the change rate of the resistance value takes the value of 1.16%, which wave exceeds the target value, when the difference between the thermal expansion coefficients of the glasses A and B is $0.46 \times 10^{-6}$/deg, as in compared case No. 7 in TABLE 4. The results further show that the change rate of the resistance value takes the value at or below the target value (1%) when the difference between the thermal expansion coefficients of the glasses A and B is at or above $0.5 \times 10^{-6}$/deg, as shown in FIG. 4.

Furthermore, in order that a sufficient microcrack restraining effect may be obtained from the glass B, the glass B having the smaller thermal expansion coefficient needs to envelop the glass A having the larger thermal expansion coefficient, as shown in FIG. 1B. For this purpose, the glass B needs to be sufficiently melted until the glass A starts to melt. Accordingly, the glass A cannot sufficiently be enveloped by the glass B when the differences are small between the glass transition points and accordingly between the temperatures at which the glasses A and B start to melt. In this structure, a sufficient compressive force is not applied to the glass B even when the difference in the thermal expansion coefficient is large between the glasses A and B.

The results of the temperature cycling test show that the change rate of the resistance value takes the value of 1.26%, which value exceeds the target value, when the difference between the glass transition points of the glasses A and B is at 24° C., as shown in compared case No. 8 in TABLE 4. The results of the test further show that the change rate of the resistance value is at or below the target value and accordingly, a sufficient microcrack restraining effect can be obtained from the glass B when the difference between the glass transition points of the glasses A and B is at or above 30° C.

In the foregoing embodiment, the low-temperature fired ceramic substrate is used as a ceramic substrate on which the thick-film resistor paste is printed and fired. However, another ceramic substrate such as an alumina substrate or an aluminum nitride substrate may be used instead of the low-temperature fired ceramic substrate.

Although the thick-film resistor paste contains $RuO_2$ as the conductive material in the foregoing embodiment, another conductive material such as $M_2Ru_2O_{7-x}$ where M=Bi, Al, etc., or $MoO_3$. Furthermore, the mixing ratio of $RuO_2$ powder is changed among 15, 20 and 25 percentage by weight to thereby vary the resistance values of the thick-film resistors in the foregoing embodiment. However, the mixing ratio of $RuO_2$ should not be limited to these values and may be determined according to a required resistance value.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A thick-film resistor paste consisting of a mixture of a first glass powder, a second glass powder, a conductive material powder, and an organic vehicle, wherein a quantity of the first glass powder mixed is larger than a quantity of the second glass powder mixed, and the first glass powder has a thermal expansion coefficient larger and a glass transition point higher than the second glass powder, and wherein the first glass powder contains, in total, 95 percentage by weight or above of CaO of 20 to 26 percentage by weight, $SiO_2$ of 37 to 59 percentage by weight, $Al_2O_3$ of 5 to 13 percentage by weight and $B_2O_3$ of 8 to 28 percentage by weight, and the second glass powder contains, in total, 85 percentage by weight or above of $SiO_2$ of 53 to 72 percentage by weight, $B_2O_3$ of 20 to 30 percentage by weight and $Na_2O$ of 1 to 7 percentage by weight.

2. A thick-film resistor paste according to claim 1, wherein the thermal expansion coefficient of the first glass powder is larger by $0.5 \times 10^{-6}$/deg or above than the thermal expansion coefficient of the second glass powder.

3. A thick-film resistor paste according to claim 1, wherein the glass transition point of the first glass powder is higher by 30 degrees Celsius or above than the glass transition point of the second glass powder.

4. A thick-film resistor paste according to claim 1, wherein each of the first and second glass powders excludes Pb, Cd and Ni.

5. A thick-film resistor paste according to claim 1, wherein the first glass powder has a mixing ratio of 73 to 99 percentage by weight to a total quantity of the first and second glass powders, and the second glass powder has a mixing ratio of 27 to 1 percentage by weight.

* * * * *

UNITED STATES PATENT AND TRADEMARK OFFICE
CERTIFICATE OF CORRECTION

PATENT NO. : 6,123,874
DATED : Setember 26, 2000
INVENTOR(S) : Masashi Fukaya.

It is certified that error appears in the above-identified patent and that said Letters Patent is hereby corrected as shown below:

Item [30] Foreign Application Priority Data, delete "October 21, 1997" and replace with --February 10, 1997--.

Signed and Sealed this

Twenty-second Day of May, 2001

*Attest:*

NICHOLAS P. GODICI

*Attesting Officer*      *Acting Director of the United States Patent and Trademark Office*